(12) United States Patent
Fasen

(10) Patent No.: US 6,911,792 B2
(45) Date of Patent: Jun. 28, 2005

(54) SYSTEM AND METHOD FOR CONTROLLING MOVEMENT

(75) Inventor: Donald J. Fasen, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 38 days.

(21) Appl. No.: 10/441,369

(22) Filed: May 20, 2003

(65) Prior Publication Data

US 2004/0232867 A1 Nov. 25, 2004

(51) Int. Cl.[7] .................. H02N 1/00; B23Q 35/127
(52) U.S. Cl. ............... 318/116; 310/309; 318/162; 388/904
(58) Field of Search ............... 318/116, 118, 318/162, 558, 560, 600, 629; 388/904; 310/300, 308, 309

(56) References Cited

U.S. PATENT DOCUMENTS

| | | | |
|---|---|---|---|
| 4,429,267 A | 1/1984 | Veale | |
| 4,493,032 A | 1/1985 | Johnson | |
| 4,568,866 A | 2/1986 | Floro et al. | |
| 4,980,625 A * | 12/1990 | Shimada | 318/568.1 |
| 5,373,439 A * | 12/1994 | Jeon | 700/63 |
| 5,392,174 A * | 2/1995 | Suzuki | 360/78.06 |
| 5,997,778 A * | 12/1999 | Bulgrin | 264/40.1 |
| 6,040,671 A | 3/2000 | Brito et al. | |
| 6,125,000 A * | 9/2000 | Carlson et al. | 360/78.08 |
| 6,127,792 A * | 10/2000 | Kamiya et al. | 318/432 |
| 6,140,787 A * | 10/2000 | Lokhorst et al. | 318/568.18 |
| 6,169,382 B1 * | 1/2001 | McKenzie et al. | 318/561 |
| 6,225,772 B1 | 5/2001 | Aizawa et al. | |
| 6,294,891 B1 | 9/2001 | McConnell et al. | |
| 6,351,201 B1 * | 2/2002 | Foster | 335/220 |
| 6,384,562 B1 | 5/2002 | Lee | |
| 6,407,522 B1 | 6/2002 | Andersson et al. | |
| 6,615,110 B2 * | 9/2003 | Matsuo et al. | 700/245 |
| 2002/0045957 A1 | 4/2002 | Otsuki et al. | |
| 2002/0185988 A1 | 12/2002 | Kaufhold et al. | |

* cited by examiner

Primary Examiner—Bentsu Ro

(57) ABSTRACT

A system and method for controlling movement of a body includes a position-based velocity profile, at least one mover, a data processor for calculating a next position of the at least one mover using data from the position-based velocity profile and passing a next position signal to the at least one mover, and an actuator for moving the mover to the next position.

22 Claims, 5 Drawing Sheets

SECTION A-A

SYSTEM AND METHOD FOR CONTROLLING MOVEMENT

FIELD OF THE INVENTION

The invention relates to a system and method for controlling relative movement between two objects.

BACKGROUND OF THE INVENTION

In micro-electro-mechanical systems (MEMS), it is often necessary to effect very small, precise movements between objects through a range of motion. To do this, the objects must be closely controlled and monitored. Specifically, the relative positions of the objects must be precisely known, and the device producing movement between the objects (often referred to as a "micro-mover" or "micro-actuator") must be capable of making very small and precise movements.

In some instances, in addition to the abilities to precisely know the relative positions of the objects and to effect precise movements of the objects, it is necessary or desirable to have a very high degree of control over the micro-actuator such that the objects may be accelerated and decelerated in a very smooth manner, while still effecting very small, precise movements with a very high resolution relative to the distance over which the objects are moved.

SUMMARY OF THE INVENTION

A system and method for controlling movement of a body is described herein. In one embodiment according to the invention, a system for controlling movement includes a position-based velocity profile, at least one mover, a data processor for calculating a next position of the at least one mover using data from the position-based velocity profile and passing a next position signal to the at least one mover, and an actuator for moving the mover to the next position.

In another embodiment according to the invention, a method for controlling the movement of a body comprises providing a current position and a target position for at least one mover, retrieving a desired mover velocity from a position-based velocity profile based on the current position and target position for the at least one mover, calculating a next position of the at least one mover using the desired mover velocity, passing a next position signal to the at least one mover, and moving the mover to the next position.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION

The present invention is directed to a system and method for controlling movement between objects (referred to herein as a "motion profiler" or "profiler"). The motion profiler embodiments described herein may be used in a variety of settings, but are particularly advantageous when used in very small computer storage devices and other MEMS systems. For purposes of illustration only, the motion profiler system and method described below will be discussed primarily in the context of an atomic resolution storage (ARS) device.

Figure 1:
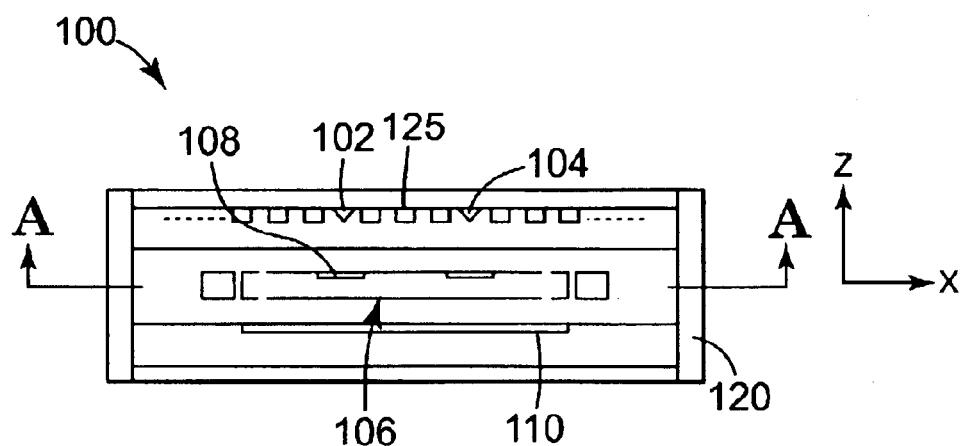
FIGS. 1–3 show different perspectives of a computer storage device with which the system and method for controlling relative movement between two objects according to an embodiment of the present invention.
Figure 2:
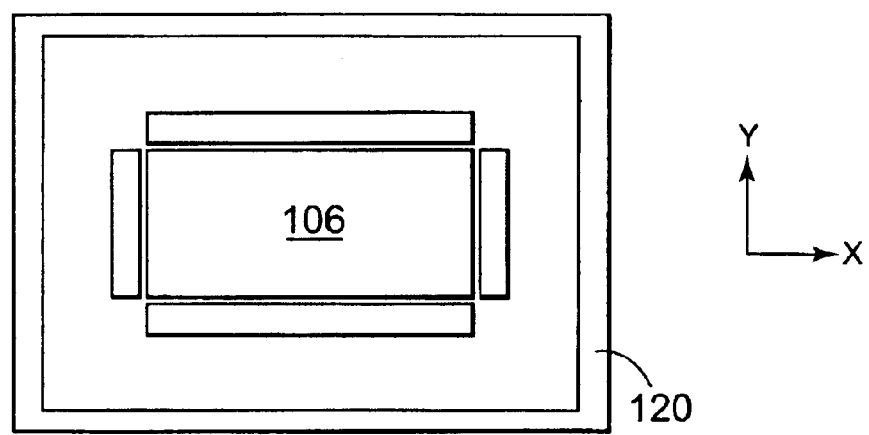

FIGS. 1 and 2, respectively, show side and top cross section views of an atomic resolution storage device 100, with which a motion profiler according to the invention may be used. Storage device 100 includes a number of field emitters, such as 102 and 104, a storage medium 106 with a number of storage areas, such as 108, and a micro-actuator 110, which scans (moves) the storage medium 106 with respect to the field emitters 102, 104 or vise versa. Storage device 100 may be configured such that each storage area 108 is responsible for storing one bit or many bits of information.

Casing 120 typically is adapted to maintain storage medium 106 in a partial vacuum, such as at least $10^{-5}$ torr. Each field emitter 102, 104 may correspond to one or more storage areas 108 provided on storage medium 106. Where each field emitter 102, 104 is responsible for a number of storage areas 108, storage device 100 typically is adapted to scan or otherwise effect relative movement between casing 120 (and thus, the field emitters) and storage medium 106. For example, micro-actuator 110 typically is adapted to scan storage medium 106 to different locations, such that each field emitter 102, 104 is positioned above different storage areas 108. With such a configuration, micro-actuator 110 can be used to scan an array (typically two-dimensional) of field emitters over the storage medium 106. Because storage medium 106 moves relative to casing 120, it will at times be referred to herein as the "mover." Correspondingly, casing 120 and various other components that are fixed relative to casing 120 (e.g., the field emitters) will at times be referred to herein as the "stator."

The field emitters 102, 104 typically are configured to read and/or write information on the storage areas 108 via electron beams they produce. The field emitters may be provided as a two-dimensional array (e.g., 100 by 100 emitters), with an emitter pitch of 50 micrometers in both the X and the Y directions. Each emitter 102, 104 may access bits in tens of thousands to hundreds of millions of storage areas 108. For example, the emitters may scan over (i.e., move relative to) a storage medium 106 that has a two-dimensional array of storage areas 108, where the periodicity between adjacent storage areas 108 is anywhere from a fraction of nanometer to 100 or more nanometers, and where the operational range of the micro-actuator is 50 micrometers in both the X and Y directions. Also, the field emitters may be addressed simultaneously or in a multiplexed manner. Parallel addressing schemes may provide storage device 100 with significant performance enhancements in terms of access time and data rates.

Figure 3:
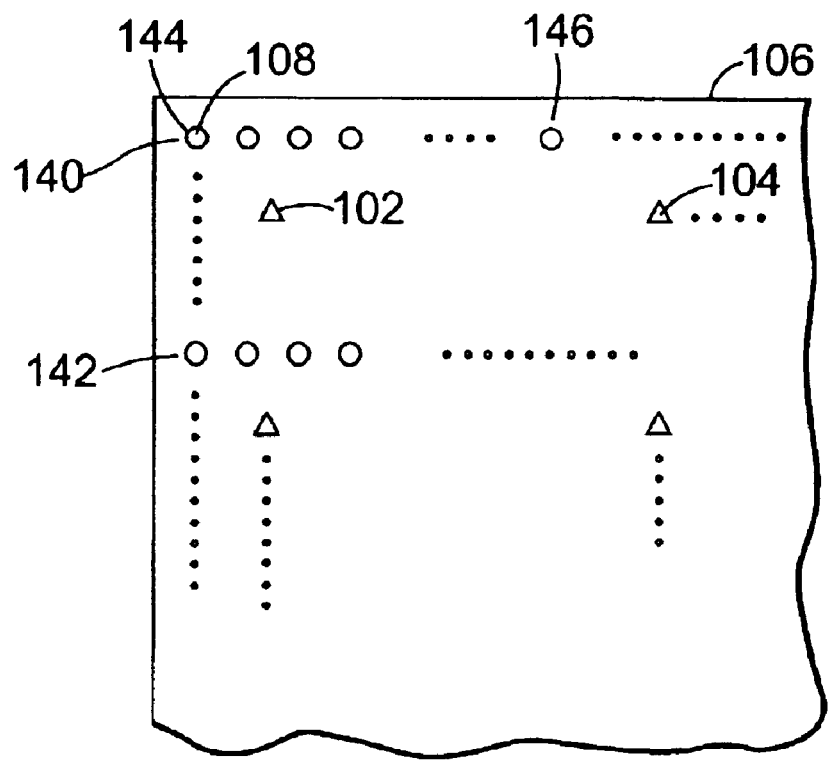

FIG. 3 is a top view of an exemplary storage medium 106 depicting a two-dimensional array of storage areas 108 and a two-dimensional array of field emitters 102, 104. External circuitry (not shown) is used to address the storage areas 108. As indicated, it is often desirable to segment storage medium 106 into rows such as rows 140, 142, where each row contains a plurality of storage areas, such as storage area 108. Typically, each emitter is responsible for a number of rows, but is not responsible for the entire length of those rows. For example, as depicted in FIG. 3, emitter 102 is responsible for the storage areas within rows 140 through 142, and within columns 144 to 146.

The foregoing describes an exemplary storage device with which the motion profiler according to the present invention may be used. Other aspects of this type of storage device are disclosed in U.S. Pat. No. 5,557,596, the disclosure of which is incorporated herein by reference.

Micro-actuator 110 may be any of a variety of types of micro-actuators. One type of micro-actuator which may be used to produce relative movement between objects such as storage medium 106 and casing 120 is an electrostatic drive. By affixing or forming electrodes on storage medium 106 and casing 120, and then applying voltages to the electrodes to generate electrostatic force, relative movement between storage medium 106 and casing 120 may be produced. By taking into account the details of the physical connection between storage medium 106 and casing 120, the voltage and resulting electrostatic force may be manipulated to control the resulting movement between the objects.

Figure 4:
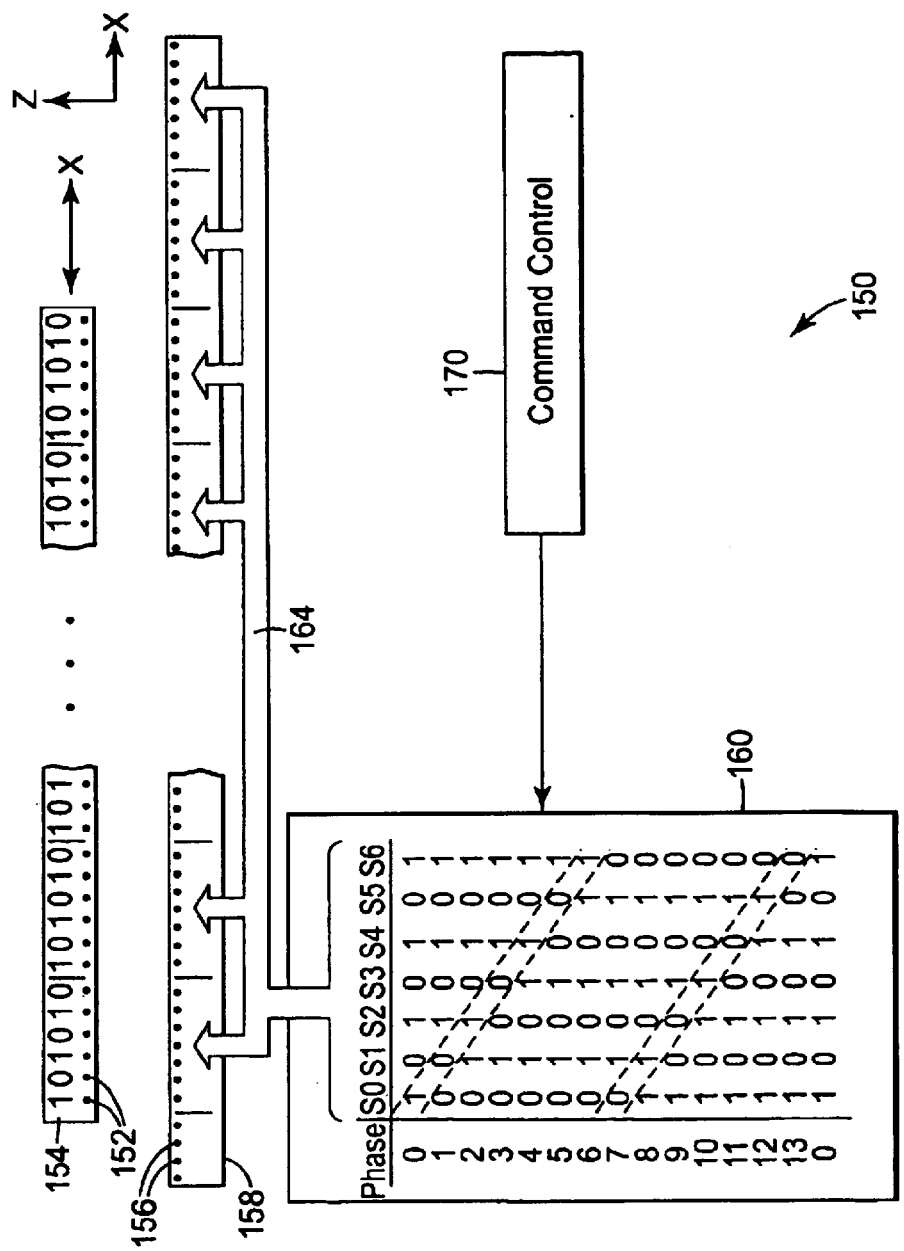
FIG. 4 is a schematic depiction of an electrostatic drive for effecting movement between two objects.

One type of micro-actuator 110 suitable for use with the present invention is depicted in FIG. 4. An electrostatic drive 150 includes a plurality of mover electrodes 152 secured to mover 154 (e.g., storage medium 106), a plurality of stator electrodes 156 secured to stator 158 (e.g., casing 120), and a driver 160. Typically, as indicated in FIG. 4, both mover electrodes 152 and stator electrodes 156 are disposed in a linear configuration which is parallel to the motion axis (e.g., the X axis or the Y axis). Driver 160 (responding to a command control 170) causes voltages to arise at mover electrodes 152 and/or stator electrodes 156, which results in application of electrostatic forces between mover 154 and stator 158. Due to fringing of the electrostatic fields and the mechanical suspension used to couple mover 154 to stator 158, the electrostatic forces cause mover 154 to move along the X and/or Y axis relative to stator 158. Varying the voltages applied to electrodes 152, 156 produces changes the relative position of the mover 154 and stator 158. Other aspects of this type of electrostatic micro-actuator are disclosed in U.S. patent application Ser. No. 10/043,971, filed Jan. 11, 2002, and commonly assigned herewith, the disclosure which is incorporated herein by reference. Upon reading and appreciating this disclosure, those skilled in the art will appreciate that similar systems may be capable of motion in multiple directions, including linear/axial motion and motion in curved directions or motions of other shapes.

The relative positions of mover 154 and stator 158 may be determined using a variety of different position sensing methods and systems. As one example, a calibrated position sensor based on a capacitance measurement can be used as a suitable high resolution encoder. Capacitive position sensors typically detect changes in position by measuring capacitance between two relative moving objects. The charge of the capacitor is measured and used to calculate a relative position between the two objects. Aspects of a suitable method and system for determining the relative positions of mover 154 and stator 158 are disclosed in U.S. patent application Ser. No. 10/100,204, filed Mar. 18, 2002, and commonly assigned herewith, the disclosure which is incorporated herein by reference.

To write and/or read data in storage areas 108 of storage medium 106, the mover 154 must accelerate to a desired scan velocity (relative to stator 158), maintain that scan velocity during the data writing and/or reading process, and then decelerate to a stop. In some systems, the accelerate/scan/decelerate process may occur in approximately 2 milliseconds. If a constant scan velocity is not maintained during the writing and/or reading process, the periodicity between areas written to or read from on storage medium 106 will not be constant, thereby leading to increased error rates in the writing and/or reading process. For example, if field emitters 102, 104 are writing data at a fixed rate, and storage medium 106 is either accelerating or decelerating during the writing process, the points to which data are written will not be uniformly spaced. A later attempt to read that data may fail unless the acceleration/deceleration profile during the read process matches the acceleration/deceleration profile of the write process for that particular data.

Mover 154 is typically connected to stator 158 by resilient flexures (not shown) that permit mover 154 to move in an X-Y plane relative to stator 158. The flexures provide very little or no mechanical motion damping of mover 154. In addition, as noted above, casing 120 typically is adapted to maintain storage medium 106 in a partial vacuum. Thus, no or only very limited air-damping of the motion of mover 154 (storage medium 106) is available. Mover 154 therefore acts as an undamped spring-mass system. Because of the undamped condition of mover 154, mover 154 is particularly vulnerable to vibration or "ringing" at a resonant frequency $f_r$ of the device. Mover 154 may be treated as an undamped mechanical oscillator having a very high Q (on the order of 8000 or more), where Q is the "quality factor" of a system. A high Q indicates low damping, a narrow angular oscillation frequency $\Delta\omega$, and a long decay time.

Vibrations at the resonant frequency $f_r$ introduce variability into the periodicity between adjacent storage areas 108, and makes accurate writing and reading of data difficult. Resonant frequency $f_r$ may vary from device to device, and is dependant on a number of variables, including the physical connection between mover 154 and stator 158, the spring stiffness of flexures supporting mover 154 within stator 158, the size and mass of mover 154, materials used to form mover 154 and stator 158, and manufacturing tolerances, to name a few.

The undamped condition of mover 154 allows harsh acceleration or deceleration of mover 154 to excite vibration at the resonant frequency $f_r$ of the device. The motion profiler system and method described herein allows a commanded acceleration and deceleration profile of any shape as is required to minimize the excitation at the mechanical resonant frequency $f_r$ and the resultant ringing after moving mover 154.

Since the amount of space (distance) and time available to accelerate and decelerate the mover is limited, the acceleration and deceleration profile must be chosen to limit the energy input to mover 154 at the mechanical resonant frequency $f_r$, yet allow rapid acceleration and deceleration to and from the desired scan velocity for accessing the data track (such as row 140 of storage areas 108). The implementation of the acceleration/deceleration profile permits movements of any length within the mover's operational range, even if the desired steady-state scan velocity is not achieved.

For smooth acceleration and deceleration of mover 154, it is desirable to reduce and smooth the jerk of the acceleration, where jerk is the time derivative of the acceleration. In one embodiment according to the invention, the acceleration profile is sine-shaped. The time derivative of a sine-shaped acceleration profile produces a reduced and smooth jerk, and results in the least resonant ringing after accelerating or decelerating mover 154. A sine-shaped acceleration profile has the benefit of easily derived integrals for velocity and position of mover 154. However, acceleration profiles different than a sine-shaped profile may be used without departing from the invention.

Figure 5:
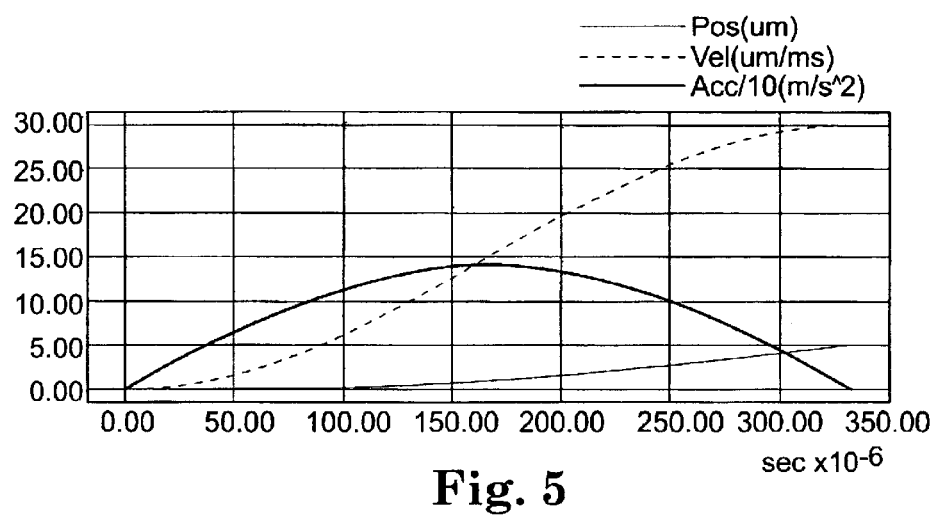
FIG. 5 is a graph showing example position, velocity and acceleration profiles according to an embodiment of the invention.

For a sine-shaped acceleration profile, the equations defining the velocity, position, and acceleration for mover 154 versus time are provided below:

Where:

$X_{acc}$ is the distance allowed for acceleration; and
$V_{scan}$ is the desired scan velocity,
Then:

The time allowed for acceleration to $V_{scan}$ is $T_a = 2X_{acc}/V_{scan}$;

The angular frequency $W_a = \pi/T_a$;

The peak acceleration $Acc_{pk} = V_{scan}W_a/2 = \pi V_{scan}^2/4X_{acc}$;

and $velocity(t) = V_{scan}(1-\cos(W_a t))/2$;

$position(t) = \int velocity(t) = V_{scan}(t - \sin(W_a t))/2\ W_a$; and $acceleration(t) = \partial velocity(t)/\partial t = V_{scan}W_a \sin(W_a t)/2$ Using the provided equations, FIG. 5 shows plots of the position, velocity, and acceleration profiles for the example case where the distance allowed for acceleration $X_{acc}$ is 5.0 μm and the desired scan velocity $V_{scan}$ is 30.0 μm/ms. For those conditions, the time $T_a$ allowed for acceleration to the desired scan velocity is 0.333 ms. Of course, the motion profiler according to the present invention may be used with systems having distance and time constraints other than the example constraints, although the resultant position, velocity and acceleration profiles will differ accordingly.

Figure 6:
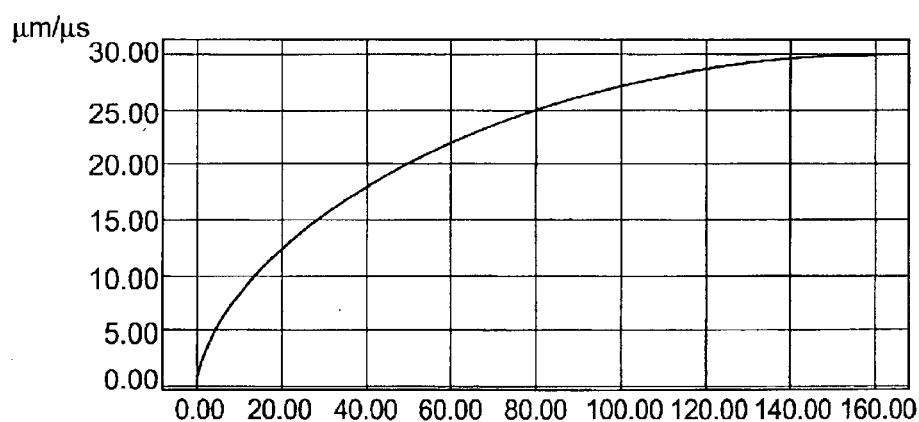
FIG. 6 is a graph showing example velocity versus position data extracted from the velocity and position profiles of FIG. 5.

Walking through the position curve of FIG. 5 and sampling the velocity curve, a velocity versus position curve or table may be extracted, as shown in FIG. 6. Recalling from above that the distance allowed for acceleration $X_{acc}$ to the desired scan velocity $V_{scan}$ of 30.0 μm/ms is 5.0 μm, it can be seen in FIG. 6 that the x-axis represents a distance of 5.0 μm that has been divided into 160 increments or index points, with each increment equaling 5.0/160 μm (approximately 0.03 μm). Of course, any different number of increments may be used, depending upon the desired or required resolution of the velocity versus position curve. The number of increments may be limited, for example, by the amount of memory available for storing the velocity versus position data.

By using position-based velocity profile data as shown in FIG. 6, any length of move by mover 154 is permitted. If mover 154 is moved to access a data track (such as row 140) to write or read data (a "scan move"), mover 154 must undergo a "full length" move (5.0 μm in the example) to reach the desired scan velocity (30.0 μm/ms in the example). In this instance, mover 154 will accelerate following the entire velocity versus position profile of FIG. 6 to reach the scan velocity, maintain the scan velocity for the duration of time necessary to access the data track, and then decelerate to a stop by reversing the acceleration profile. However, if mover 154 is being moved to an adjacent data track (such as from row 140 to row 142) in preparation to write or read data (a "seek move"), mover 154 may be required to move less than the distance required to reach the desired scan velocity (i.e., shorter than a full length move). In this instance, mover 154 will accelerate following the velocity versus position profile of FIG. 6 until one half the required move distance has been traversed, and then decelerate to a stop by reversing the acceleration profile. A seek move may also be longer than the distance required to reach the scan velocity (i.e., longer than a full length move). In this instance, mover 154 will accelerate following the velocity versus position profile of FIG. 6 until the scan velocity is reached, maintain the scan velocity until mover 154 is within the "full length" (5.0 μm in the example) of the acceleration/deceleration profile of FIG. 6, and then decelerate to a stop by reversing the acceleration profile. By indexing the velocity versus position table with the value of the commanded position (that is, how far mover 154 must move from a given position), the desired end position can be reached with the correct acceleration and deceleration profile for any length of move without scaling the velocity versus position values for various move lengths, as would be required for a velocity versus time profile. As noted above, the deceleration profile is simply the reverse of the acceleration profile shown in FIG. 6.

Figure 7:
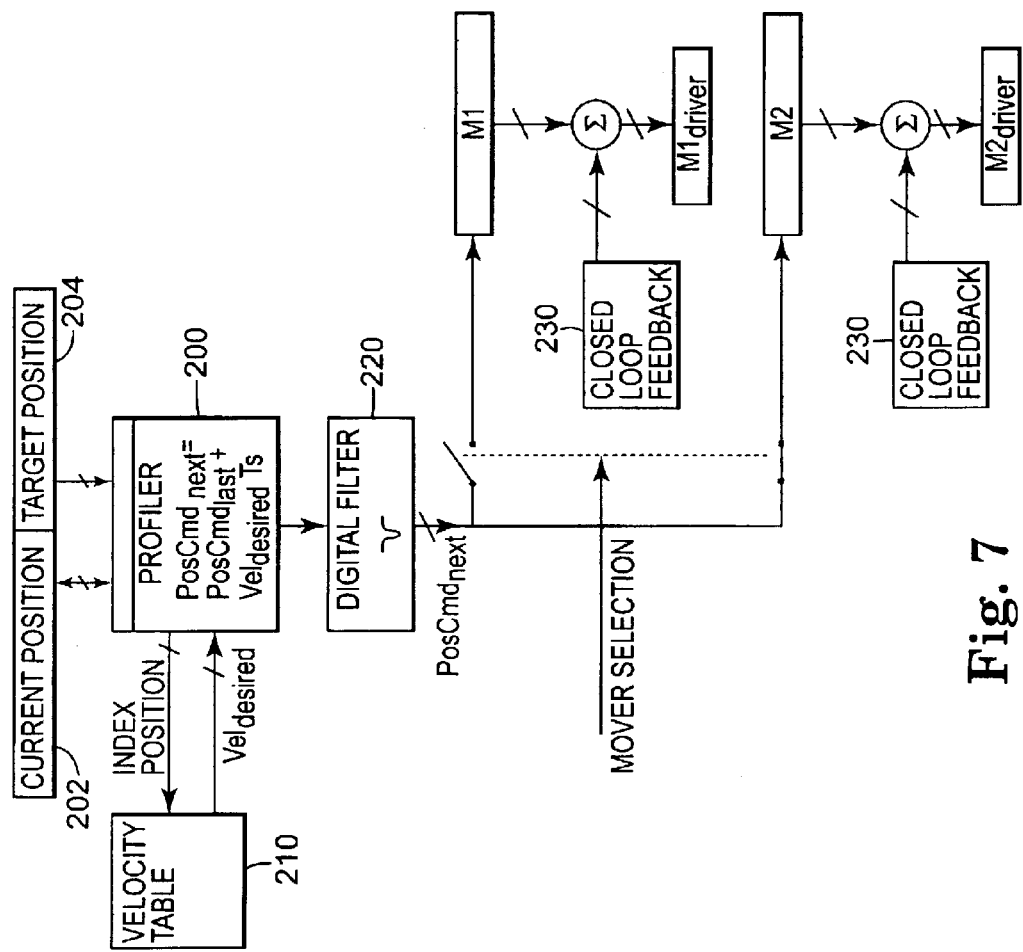
FIG. 7 is a block diagram illustrating a motion profiler system and method according to an embodiment of the invention.

Referring to FIG. 7, a block diagram of a motion profiler system and method for controlling the movement of movers M1 and M2 according to the invention is illustrated. Movers M1 and M2 in FIG. 7 may be individual movers 154, or may alternately be a group of movers controlled in parallel.

Profiler 200 is a data processor, preferably a digital data processor, that is provided with a current position 202 and a target position 204 for at least one mover. Current position 202 is based upon the last commanded position of the selected mover. Target position 204 is based upon the position of the data track to be accessed. In one embodiment according to the invention, to accommodate the desired range and resolution of movement of the movers, target position 204 is a 19 bit digital word. Depending upon the required range and resolution of movement of the movers, target position 204 may be larger or smaller than a 19 bit digital word.

Using the current position 202 and target position 204 of mover M1, M2, profiler 200 indexes velocity table 210. Specifically, the current position 202 and target position 204 are used to determine the "distance from start" on the acceleration portion of the move, or the "distance to go" on the deceleration portion of the move. Using either the "distance from start" or the "distance to go", any of several well-known table look-up interpolation methods (such as straight-line interpolation or higher order polynomial-based interpolation) is used to index the velocity table 210 and provide the desired velocity $Vel_{desired}$ to profiler 200. Using the desired velocity retrieved from velocity table 210, profiler 200 calculates the next commanded position ($PosCmd_{next}$) as the sum of the last commanded position ($PosCmd_{last}$) and the desired velocity $Vel_{desired}$ times the control update period Ts, where Ts is the time interval at which profiler 200 updates. That is, $PosCmd_{next} = PosCmd_{last} + Vel_{desired}Ts$. The next commanded position $PosCmd_{next}$ is passed to the at least one selected mover and its associated driver (M2 and $M2_{driver}$ in the example of FIG. 7). In addition, the next commanded position $PosCmd_{next}$ becomes the last commanded position $PosCmd_{last}$ and is used to update the current position 202. As discussed above with respect to target position 204, in one embodiment according to the invention, to accommodate the desired range and resolution of movement of the movers, the next commanded position $PosCmd_{next}$ is a 19 bit digital word. Depending upon the required range and resolution of movement of the movers, the next commanded position $PosCmd_{next}$ may be larger or smaller than a 19 bit digital word.

In one embodiment according to the invention, to minimize the energy input to the movers' mechanical resonance frequency $f_r$, prior to being passed to the selected mover(s), the next commanded position $PosCmd_{next}$ is passed through filter 220. Filter 220 is preferably by a notch filter, and more preferably a digital notch filter. Filter 220 processes the next commanded position signal to further reduce or eliminate energy at the resonant frequency $f_r$ of the mover. In one embodiment of the invention, if the memory available for storing velocity table 210 is adequately large, the characteristics of filter 220 may be integrated into the data of velocity table 210. In another embodiment according to the invention, the resonant frequency $f_r$ of individual movers is measured during their manufacturing process, such that filter 220 may be tuned to filter at the resonant frequency of each particular mover.

Using the next commanded position $PosCmd_{next}$, drivers $M1_{driver}$ and $M2_{driver}$ move their associated movers M1 and M2, respectively, to the next commanded position. Drivers M1$_{driver}$ and M2$_{driver}$ may be, for example, the electrostatic drive 150 disclosed in U.S. patent application Ser. No. 10/043,971 and referenced above.

In one embodiment according to the invention, a position sensing system may be coupled to micro-actuators 110 to provide a closed-loop feedback 230. Closed-loop feedback 230 may be implemented to provide additional position and velocity control over individual movers, independent of the commanded position from profiler 200. Closed-loop feedback 230 may be provided, for example, using the method and system for determining position of a body as disclosed in U.S. patent application Ser. No. 10/100,204 and referenced above.

What is claimed is:

1. A method for controlling the movement of a body, the method comprising:

providing a current position and a target position for at least one mover;

retrieving a desired mover velocity from a position-based velocity profile based on the current position and target position for the at least one mover;

calculating a next position of the at least one mover using the desired mover velocity;

passing a next position signal to the at least one mover; and moving the mover to the next position.

2. The method of claim 1, wherein retrieving a desired mover velocity comprises indexing the position-based velocity profile using the current position and target position.

3. The method of claim 2, wherein indexing the position-based velocity profile includes moving the mover any distance within the mover's operational range.

4. The method of claim 1, further comprising updating the current position with the next position.

5. The method of claim 4, further comprising:

retrieving a new desired mover velocity from the position-based velocity profile;

calculating a new next position of the at least one mover using the new desired mover velocity;

passing a new next position signal to the at least one mover; and moving the mover to the new next position.

6. The method of claim 5, further comprising:

achieving a constant mover velocity by repeatedly updating the current position with the new next position, retrieving a new desired mover velocity from the position-based velocity profile, calculating a new next position of the at least one mover using the new desired mover velocity, passing a new next position signal to the at least one mover, and moving the mover to the new next position.

7. The method of claim 1, wherein moving the mover to the next position comprises accelerating the mover.

8. The method of claim 1, wherein moving the mover to the next position comprises decelerating the mover.

9. The method of claim 1, further comprising filtering the next position signal to remove energy at the at least one mover's resonant frequency before moving the at least one mover to the next position.

10. The method of claim 9, wherein filtering the next position signal comprises integrating filter characteristics into the position-based velocity profile.

11. The method of claim 1, further comprising deriving the position-based velocity profile from a sine-shaped acceleration profile.

12. The method of claim 1, further comprising providing closed-loop feedback to control the velocity and position of the at least one mover.

13. The method of claim 1, wherein moving the mover to the next position comprises actuating an electrostatic drive to move the mover to the next position.

14. A movement control system comprising:

a position-based velocity profile;

at least one mover;

a data processor for calculating a next position of the at least one mover using data from the position-based velocity profile and passing a next position signal to the at least one mover; and an actuator for moving the mover to the next position.

15. The movement control system of claim 14, wherein the position-based velocity profile is a velocity table stored in random access memory accessible by the data processor.

16. The movement control system of claim 14, further comprising a filter for removing energy at the at least one mover's resonant frequency from the next position signal.

17. The movement control system of claim 16, wherein the filter comprises a digital notch filter.

18. The movement control system of claim 14, further comprising a closed-loop position feedback system coupled to the actuator for controlling velocity and position of the at least one mover.

19. The movement control system of claim 18, wherein the closed-loop position feedback system is a capacitive position sensing system.

20. The movement control system of claim 14, wherein the actuator for moving the mover comprises an electrostatic drive.

21. A system for controlling movement of a body, the system comprising:

means for determining a next position of a body using data from a position-based velocity profile;

means for moving the body to the next position; and means for removing energy at a resonant frequency of the body.

22. A system for controlling movement of a body, the system comprising:

means for determining a next position of a body using data from a position-based velocity profile; and means for moving the body to the next position, wherein the means for moving the body to the next position comprises an electrostatic drive.

* * * * *